Patented Dec. 5, 1944

2,364,054

UNITED STATES PATENT OFFICE 2,364,054

REGULATION OF PLANT GROWTH

George S. Avery, Jr., New London, Conn., assignor to The Dow Chemical Company, Midland, Mich., a corporation of Michigan No Drawing. Application September 23, 1940,
Serial No. 358,040

2 Claims. (Cl. 47—58)

This invention relates to the regulation of plant growth and is particularly concerned with the extension of the dormant or rest period of plants by the application of aryl- and aryloxy-aliphatic acids to plant surfaces.

The regulation of plant growth has been extensively investigated with respect to stimulation of root development, prevention of fruit drop, and parthenocarpic fruit development. Considerable research has also been carried out on methods and means for breaking dormancy. A particular phase of plant growth control which has long constituted a major problem to the horticulturist is that of controlling the foliation and blooming of fruit trees and ornamentals so as to avoid the injury frequently resulting from late spring frosts and unseasonable periods of cold and inclement weather. The occurrence of killing frosts and prolonged cold spells in the time of year immediately following blooming and foliation has not infrequently resulted in the substantial destruction of the season's crop for growers of citrus fruits and of apples, peaches, plums, apricots, and other deciduous varieties. Preventive methods heretofore employed have been, for the most part, mechanical. Orchards in bloom, where possible, have been covered to protect the blossoms and blossom and leaf buds. Other means have comprised the use of smudge pots or other warming devices, or the forced circulation of warm air in and around the trees. Such methods are not only expensive but relatively inefficient since they do not offer protection in the event that the temperature drops below freezing for any extended period of time. The need exists for some relatively inexpensive method whereby the breaking of dormancy and development of flower and leaf buds may be delayed to avoid frost and freezing injury.

According to the present invention the foliation and blooming of plants and particularly of fruit trees and ornamentals is controlled and the dormant period extended by the application to the dormant plant or tree of spray materials comprising relatively small amounts of aryl- and aryloxy-lower aliphatic acids. The term "aryl" as herein employed refers to such radicals as phenyl, naphthyl, and substituted phenyl and naphthyl groupings. The term "aryloxy" refers to the corresponding oxygenated radicals, as, for example, those derived from phenols, naphthols, and the like. The lower aliphatic acids which are substituted by the aryl- or aryloxy-radicals to provide the compounds with which the invention is concerned are preferably those containing from 2 to 4 carbon atoms, inclusive. The expression "lower" in its broad sense includes aliphatic acid structures containing up to and including 8 carbon atoms in the molecule. A preferred embodiment of the invention resides in the aryl- and aryloxy-acetic acids.

In carrying out the invention the required amount of the substituted aliphatic acid is incorporated into a suitable spray composition and applied to the plant or tree from one to three weeks prior to the normal foliation and blooming period. The exact concentration of active ingredient employed may vary between about 1 part and 1000 parts per million, depending upon the variety of plant, the time of application, the length of time for which it is desired to extend the dormant period, and the tolerance of the plant for the particular compound concerned. Good results have been obtained with spray compositions containing from about 25 to about 100 parts per million of the substituted acid compound.

The make-up of the spray composition in which the plant growth regulating material is incorporated is not critical. A dilute aqueous solution or suspension of the acid compound alone or combinations thereof with various wetting, dispersing, sticking, or buffering agents may be employed. Similarly the plant growth material may be incorporated in the usual dormant sprays, as, for example, in oil emulsions or other compositions ordinarily employed in the standard dormant spray schedule.

The application of the compositions as described above to the plant surfaces prior to termination of dormancy will extend the dormant period for from several days to a week or more, depending upon the time of application, the plant variety concerned, and the concentration of acid compound employed. The premature swelling and opening of the leaf and flower buds is thereby avoided and, accordingly, the danger of injury from late frost or freeze is minimized. After the influence of the growth regulating substance has passed, the flower buds open normally and set and produce fruit as might be expected of untreated trees. An added advantage not infrequently accruing to the treatment is the effect upon the formation of the bud abscission layer whereby the tendency of flower and leaf buds to abscise is materially reduced.

The suggested treatment is of particular importance with respect to large scale peach, apple, cherry, apricot, and plum production in those portions of the temperate zone where late spring frosts are the rule rather than the exception. The treatment is relatively inexpensive and where combined with the customary dormant spray schedule does not materially increase the over-all cost of the annual spray program.

The following examples are illustrative with respect to the particular compounds and concentrations thereof employed but are not to be construed as limiting the invention. In these examples, small lilacs were employed as the test plants to expedite the obtaining of strictly comparable results.

Example 1

0.01 part by weight of alpha-naphthylacetic acid, 0.05 part by weight of sodium-lauryl sulfate, and 99.94 parts by weight of water were mixed together until the alpha-naphthylacetic acid was entirely dispersed. This composition, containing 100 parts per million of the alpha-naphthylacetic acid, was applied to dormant lilacs (*Syringa vellosa rosea*). Controlled determinations were made with an aqueous spray comprising the sodium-lauryl sulfate alone. Observations were also carried out on unsprayed trees. Twelve days after application, the unsprayed trees and those treated with the sodium-lauryl sulfate solution began to develop leaves from the lateral buds. The lateral buds of the trees treated with the composition comprising the alpha-naphthylacetic acid did not begin to swell and put forth leaves until 24 days after the treatment, at which time the controls had leaves three-quarters of an inch in length.

Example 2

In a similar manner compositions comprising 100 parts per million of phenylacetic acid and phenoxyacetic acid were applied to dormant lilacs. The results observed were identical with those set forth in Example 1. The phenylacetic acid was found to be particularly effective at 1.25 to 100 parts per million or higher. Phenoxyacetic acid was particularly effective at 25 to 100 parts per million or higher.

Example 3

A composition adapted to be employed as a spray to extend the dormant period of apple trees and also for the control of scale is as follows:

| | Parts by weight |
|---|---|
| Light lubricating oil | 3.0 |
| Partially neutralized sulfonated whale oil | 0.75 |
| Alpha-naphthylacetic acid | 0.0025 |
| Water | 96.2475 |

This composition is applied from one to two weeks prior to the normal blossoming and foliation period.

Other compounds which may be similarly employed include 2-carboxy-phenoxyacetic acid, which is effective at 25 to 100 parts per million or higher; dihydroxy-benzylacetic acid, which is effective at 50 to 100 parts per million or higher; phenoxypropionic acid, which is effective at 25 to 100 parts per million or higher; alpha-naphthylpropionic acid, alpha-naphthylbutyric acid phenylbutyric acid, and the like.

While the sprays described above are applied to the trees during the dormant or resting period, they are not essentially "dormant sprays" as the expresison is generally understood. The usual "dormant application or spray" frequently is applied to the tree immediately prior to blossoming or during the pre-pink stage for the control of insects such as aphis and scale. The present invention is concerned with the application of the aryl- and aryloxy-substituted lower aliphatic acids and particularly of sprays comprising such compounds to the growing plant during the non-vegetative or dormant period at a time sufficiently ahead of the normal blossoming or foliation time to accomplish the extension of the dormant or rest period. The "normal blossoming time" varies with locality but in any instance is that period over which unsprayed trees habitually blossom or foliate.

The present application is a continuation-in-part of my copending application Serial No. 251,248, filed January 16, 1939.

Other modes of applying the principle of my invention may be employed instead of those explained, change being made as regards the method herein disclosed, provided the steps stated by any of the following claims or the equivalent of such stated steps be employed.

I, therefore, particularly point out and distinctly claim as my invention:

1. In a method for extending the dormant period of trees, normally blossoming and foliating at such a time as to be injured by frost and killing temperatures, the step of applying to the dormant tree a spray comprising a relatively small amount of phenoxyacetic acid.

2. In a method for extending the dormant period of trees, normally blossoming and foliating at such a time as to be injured by frost and killing temperatures, the step of applying to the dormant tree a spray comprising a relatively small amount of a phenoxy-lower aliphatic acid.

GEORGE S. AVERY, Jr.